United States Patent [19]

Moroi et al.

[11] Patent Number: 5,510,684
[45] Date of Patent: Apr. 23, 1996

[54] DRIVE CONTROL CIRCUIT FOR MOTOR

[75] Inventors: Hidehiro Moroi, Iwata; Kazutomo Kakegawa, Shizuoka, both of Japan

[73] Assignee: Asmo Co., Ltd., Kosai, Japan

[21] Appl. No.: 349,492

[22] Filed: Dec. 2, 1994

Related U.S. Application Data

[63] Continuation of Ser. No. 52,488, Apr. 23, 1993, abandoned.

[51] Int. Cl.[6] .................................................. H02P 3/00
[52] U.S. Cl. ..................... 318/282; 318/443; 318/DIG. 2; 15/250.12
[58] Field of Search ....................... 312/280–286, 312/443, 444, DIG. 2; 15/250 R, 250.12, 250.13; 307/10.1; 160/11

[56] References Cited

U.S. PATENT DOCUMENTS

| | | | |
|---|---|---|---|
| 3,293,526 | 3/1964 | Boyajian | 318/484 |
| 4,276,501 | 6/1981 | Fanz | 318/470 |
| 4,336,482 | 6/1982 | Goertler et al. | 318/443 |
| 4,451,768 | 5/1984 | Kohler et al. | 318/443 |
| 4,459,518 | 7/1984 | Chevallier | 318/286 |
| 4,468,596 | 8/1984 | Kinz et al. | 318/287 |
| 4,614,903 | 9/1986 | Betsch et al. | 318/443 |
| 4,689,535 | 8/1987 | Tsunoda et al. | 318/444 X |
| 4,742,280 | 5/1988 | Ishikawa et al. | 318/282 |
| 4,896,084 | 1/1990 | Maue et al. | 318/280 |
| 4,929,876 | 5/1990 | Kato | 318/444 |
| 5,049,794 | 9/1991 | Okada et al. | 318/443 |
| 5,252,897 | 10/1993 | Porter et al. | 318/443 |
| 5,306,991 | 4/1994 | Suzuki | 318/443 |

FOREIGN PATENT DOCUMENTS

| | | |
|---|---|---|
| 3516985A1 | 8/1986 | Germany. |
| 3823574C1 | 11/1989 | Germany. |
| 3936880A1 | 5/1991 | Germany. |
| 59-16528 | 9/1984 | Japan. |
| 61-203516 | 9/1986 | Japan. |

*Primary Examiner*—Jonathan Wysocki
*Attorney, Agent, or Firm*—Stetina Brunda & Buyan

[57] ABSTRACT

A drive control circuit includes a first and a second relays, each of which selectively connects one of the terminals of a motor with a power supply. A power connecting circuit can connect the power supply with each one of the relays. A control circuit controls the power connecting circuit to disconnect the power supply from the first and second relays, and then controls to switch the connecting arrangements between the power supply and each terminal of the motor utilizing the first and second relays. Therefore, the rotational direction of the motor is switched, or the rotation of the motor is stopped.

5 Claims, 6 Drawing Sheets

DRIVE CONTROL CIRCUIT FOR MOTOR

This application is a continuation of application Ser. No. 08/052,488, filed Apr. 23, 1993.

BACKGROUND OF THE INVENTION

1. Field of the Invention

The present invention relates to a drive control circuit for a motor. More specifically, the present invention pertains to a drive control circuit that protects contacts of switches for controlling rotational directions of the motor.

2. Description of the Related Art

A conventional direct current motor of this type is employed for driving wipers mounted on a vehicle. As shown in FIG. 9, the conventional direct current motor 51 for driving wipers is electronically connected between a power supply 57 and a ground 58. The motor 51 has two connection terminals, a first terminal and a second terminal. The first terminal is connected with a first relay Ry52, and the second terminal with a second relay Ry53, respectively. A contact 55 of the first relay Ry52 is connected with the power supply 57, and a contact 56 thereof is connected with the ground 58. A movable contact 54 of the first relay Ry52 is selectively connected with either one of the contacts 55 or 56, by means of a switching control circuit (not shown).

A contact 60 of the second relay Ry53 is connected with the power supply 57, and a contact 61 thereof is connected with the ground 58. A movable contact 59 of the second relay Ry53 is selectively connected with either one of the contacts 60 or 61, by means of the switching control circuit (not shown).

Therefore, when the movable contact 54 of the first relay Ry52 is connected with the contact 55, and the movable contact 59 of the second relay Ry53 is connected with the contact 61, by means of the switching control circuit, the motor 51 rotates in the forward direction in response to current I10 flowing from the power supply 57 to the motor 51. On the contrary, when the movable contact 54 of the first relay Ry52 is connected with the contact 56, and the movable contact 59 of the second relay Ry53 is connected with the contact 60, by means of the switching control circuit, the motor 51 rotates in the reverse direction, in response to current I11 flowing from the supply 57 to the motor 51.

On the other hand, in order to cause the motor 51 to be stopped, the movable contacts 54 and 59 of the first and second relays Ry52 and Ry53 are respectively connected with the contacts 56 and 61, and each first and second connection terminals of the motor 51 is connected with the ground 58. Consequently, a closed loop including the motor 51 is formed. A current flow is generated in the motor in the opposing direction to the direction of the current flow during the motor 51 is regularly rotated. The current flow is caused by electromotive force generated by means of the force of inertia of the motor 51. Therefore, the motor 51 is immediately stopped.

However, when the movable contact 54 of the relay Ry52 is disconnected from the contact 55, and then connected with the contact 56, in order to stop the motor 51, electric discharge may occurs between the movable contact 54 and the contact 55, because of the potential difference between the contacts 55 and 56, which may cause the contacts 55 and 56 to electrically connect each other. In such a case, short-circuit current I12 flows to a motor drive circuit, from the power supply 57 via the contacts 55 and 56, a problem arises in that each of the contacts 55 and 56 is melted down and the first relay is damaged.

SUMMARY OF THE INVENTION

Accordingly, it is a primary object of the present invention to provide a drive control circuit for a motor, which protects contacts of switches from short-circuit current.

To achieve the foregoing and other objects, and in accordance with the purpose of the present invention, the drive control circuit of the present invention includes a first and a second relays, each of which can selectively connect each one of connection terminals of a motor with a power supply. A power connecting circuit can connect the power supply with each one of the relays. A control circuit controls the power connecting circuit to disconnect the power supply from the first and second relays, and then controls to switch the connecting arrangements between the power supply and each terminal of the motor by means of the first and second relays. Therefore, the rotational direction of the motor is switched, or the rotation of the motor is stopped.

BRIEF DESCRIPTION OF THE DRAWINGS

The features of the present invention that are believed to be novel are set forth with particularity in the appended claims. The invention, together with the objects and advantages thereof, may best be understood by reference to the following description of the present embodiments together with the accompanying drawings, in which:

DETAILED DESCRIPTION OF THE PREFERRED EMBODIMENTS

Figure 1:
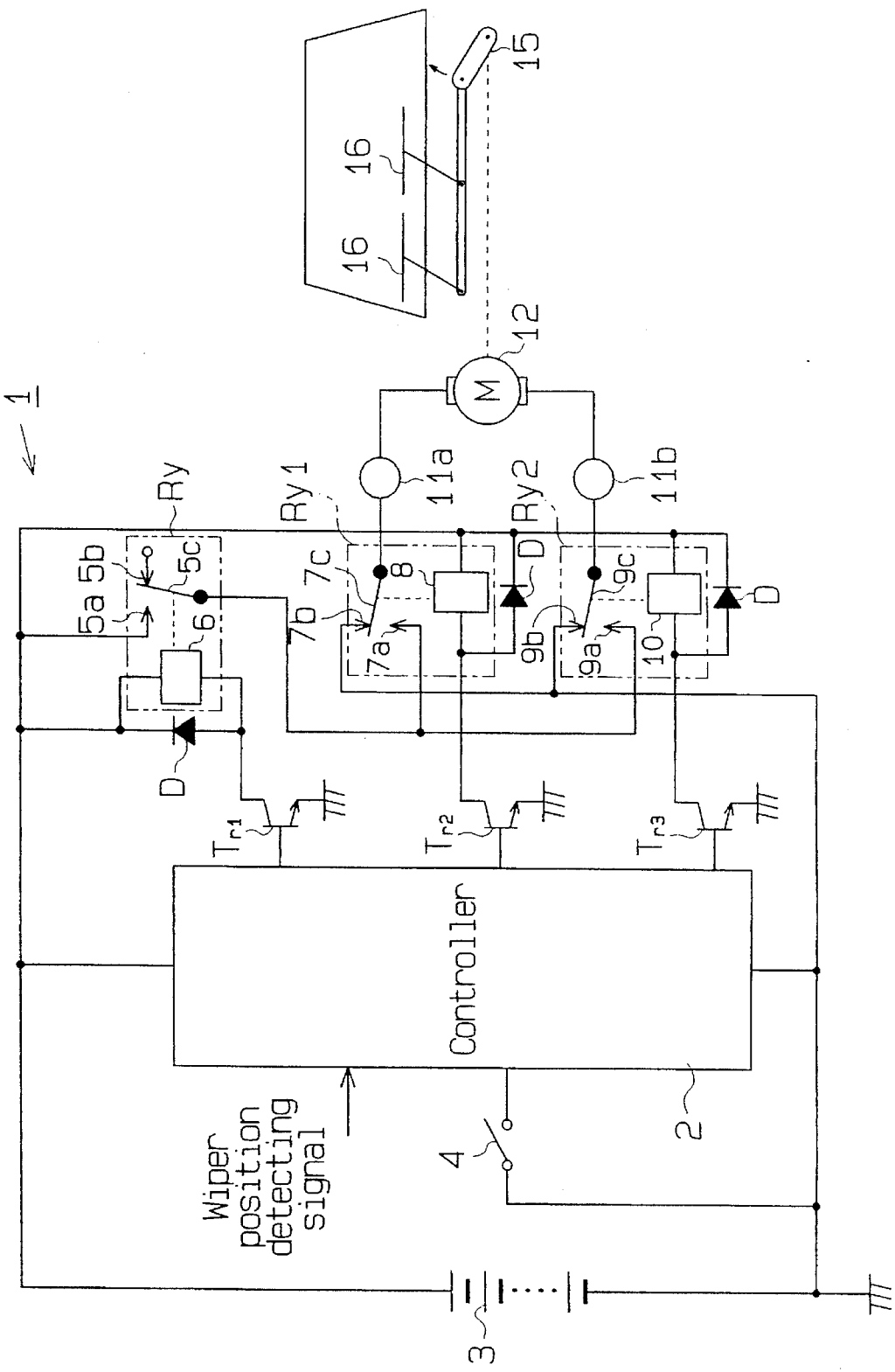
FIG. 1 is a block diagram illustrating a drive control circuit for a direct current motor according to an embodiment of the present invention.

A preferred embodiment of a drive control circuit for a direct current motor, which drives wiper arms mounted on a vehicle, according to the present invention will now be described referring to the drawings.

Figure 8A:
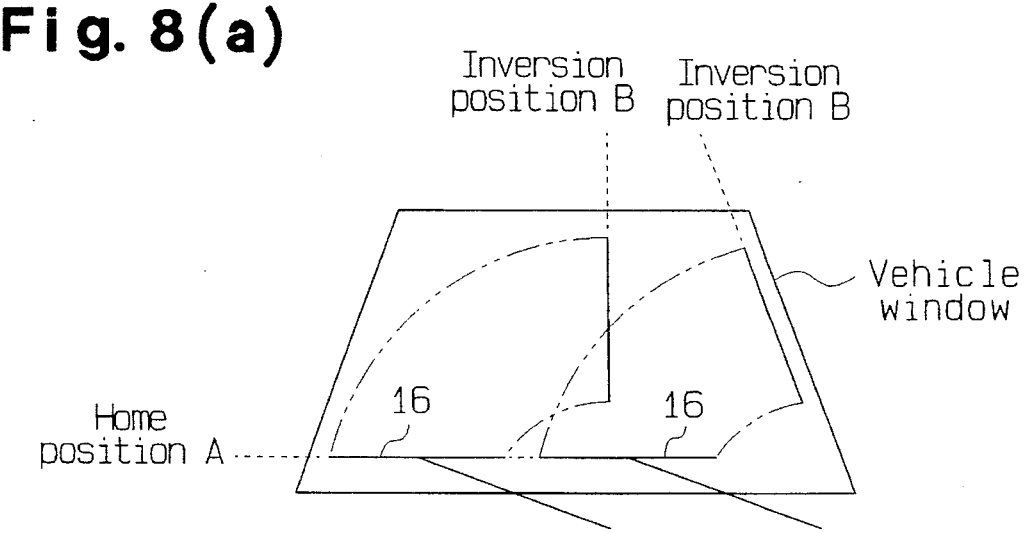
FIGS. 8(a) and (b) are schematic diagrams illustrating configurations of wipers and crank arms, which are driven by the motor of FIG. 1.

Wiper arms 16 shown in FIG. 8(a) are driven by a direct current motor 12 shown in FIG. 1, via crank arm 15. The crank arms 15 moves forward or backward between a first inversion position X and a second inversion position Y, in response to a forward or a backward rotation of the motor 12. Forward and backward movements of the crank arm 15 are transmitted to the wiper arms 16. Therefore, every time the crank arm 15 moves forward or backward, the wiper arms 16 move forward and backward between the wiper home position A and the wiper inversion position B.

A control circuit 1 for driving the motor 12 includes a controller 2, a direct current power supply 3, a power supplying relay Ry, and a first and a second relays Ry1 and Ry2. The controller 2 is electronically connected with the power supply 3. A start switch 4 is connected with the controller 2. The control circuit 1 is activated, when the switch 4 is turned on. A positive electrode of the power supply 3 is connected with a first contact 5a of the power supplying relay Ry. A second contact 5b of the power supplying relay Ry is a normally open contact. When the power supplying relay Ry is not activated, a movable contact 5c is connected with the second contact 5b. When the power supplying relay Ry is activated, the movable contact 5c is connected with the contact 5a.

The positive electrode of the power supply 3 is connected with one distal end of an exiting coil 6 of the power supplying relay Ry, and the other distal end of the coil 6 is connected with a collector of an NPN transistor Tr1. An emitter of the transistor Tr1 is grounded. A base of the transistor Tr1 is connected with the controller 2. When a signal having an H level potential (high electric potential) is transmitted from the controller 2 to the base of the transistor Tr1, the transistor Tr1 becomes conductive or is turned on. Consequently, the coil 6 is energized or excited, so as to cause the power supplying relay Ry to become operative. Therefore, the movable contact 5c is disconnected from the contact 5b, and is then connected with the contact 5a.

When a signal having a L level potential (low electric potential) is transmitted from the controller 2 to the base of the transistor Tr1, the transistor Tr1 becomes nonconductive or is turned off. Consequently, the coil 6 is deenergized, to cause the power supplying relay Ry to become non-operative. Therefore, the movable contact 5c is disconnected from the contact 5a, and is then connected with the contact 5b. A diode D is connected with the coil 5 in parallel, which bias the current in reverse direction. The diode D absorbs back electromotive force, which is generated when the coil 6 is de-energized, in such a way that the back electromotive force does not exceed withstand voltage between the collector and emitter of the transistor Tr1.

The movable contact 5c of the power supplying relay Ry is connected with each one of contact points 7a and 9a of the first and second relays Ry1 and Ry2, respectively. Each one of contacts 7b and 9b of the relays Ry1 and Ry2 is respectively connected with a negative electrode of the power supply. A movable contact 7c of the relay Ry1 is selectively connected with either one of the contacts 7a or 7b. When the relay Ry1 is not activated, the movable contact 7c is connected with the contact 7b. The movable contact 7c is connected with the first terminal of the motor 12, via a connecting terminal 11a.

One distal end of an exiting coil 8 of the relay Ry1 is connected with the positive electrode of the power supply 3, and the other distal end of the coil 8 is connected with a collector of an NPN transistor Tr2. An emitter of the transistor Tr2 is grounded. A base of the transistor Tr2 is connected with the controller 2. When a signal having an H level potential (high electric potential) is transmitted from the controller 2 to the base of the transistor Tr2, the transistor Tr2 becomes conductive or is turned on. Consequently, the coil 8 is energized, to cause the relay Ry1 to become operative. As a result, the movable contact 7c is disconnected from the contact 7b, and is then connected with the contact 7a.

When a signal having a L level potential (low electric potential) is transmitted from the controller 2 to the base of the transistor Tr2, the transistor Tr2 becomes nonconductive or is turned off. Hence, the coil 8 is deenergized to cause the relay Ry1 to become non-operative. As a result, the movable contact 7c is disconnected from the contact 7a, and is then connected with the contact 7b. A diode D is connected in parallel with the coil 8, in order to absorb back electromotive force, similar to the abovedescribed power supplying relay Ry.

A movable contact 9c of the second relay Ry2 is selectively connected with either one of the contacts 9a or 9b. When the relay Ry2 is not activated, the movable contact 9c is connected with the contact 9b. The movable contact 9c is connected with the second terminal of the motor 12, via a connection terminal 11b. The positive electrode of the power supply 3 is connected with one distal end of an exiting coil 10 of the second relay Ry2, and the other distal end of the coil 10 is connected with a collector of an NPN transistor Tr3. An emitter of the transistor Tr3 is grounded. A base of the transistor Tr3 is connected with the controller 2. When a signal having an H level potential (high electric potential) is transmitted from the controller 2 to the base of the transistor Tr3, the transistor Tr3 becomes conductive or is turned on. Consequently, the coil 10 is energized to cause the relay Ry2 to become operative. As a result, the movable contact 9c is disconnected from the contact 9b, and is then connected to the contact 9a.

A signal having an L level potential (low electric potential) is transmitted from the controller 2 to the base of the transistor Tr3, the transistor Tr3 becomes non-conductive or is turned off. Consequently, the coil 10 is de-energized to cause the second relay Ry2 to become non-operative. As a result, the movable contact 9c is disconnected from the contact 9a, and is then connected with the contact 9b. Further, a diode D is connected with the coil 10 in parallel, in order to absorb back electromotive force, similar to the above-described power supplying relay Ry.

In this embodiment, a switch (not shown) is provided for detecting the position of the wipers. This switch transmits a detection signal having an H level potential (shown in FIG. 2) to the controller 2 (shown in FIG. 1) while the wiper arms 16 are activated, and a signal having a low level potential when the wiper arms 16 reach the wiper home position A.

Figure 8B:
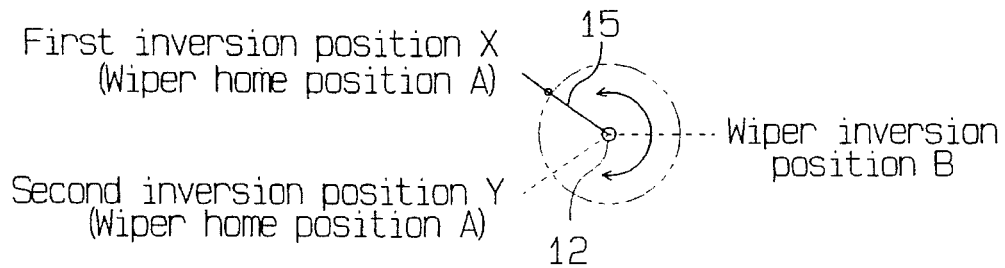
Figure 9:
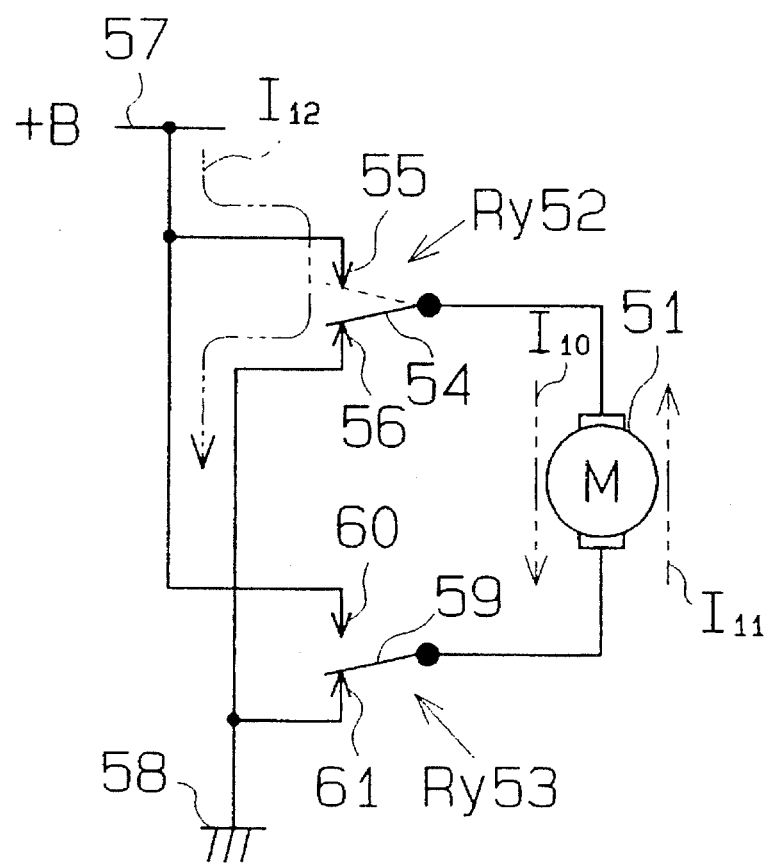
FIG. 9 is a block diagram illustrating a conventional drive control circuit for a direct current motor.

According to this embodiment, when the motor 12 turns in the forward direction, the crank arm 15 shown in FIG. 8(b) is rotated from the first inversion position X to the second inversion position Y, in the clockwise direction. The pair of the wiper arms 16 forwardly move from the home position A to the inversion position B, and then backwardly move to the home position A, based on the rotation of the crank arm 15.

Figure 2:
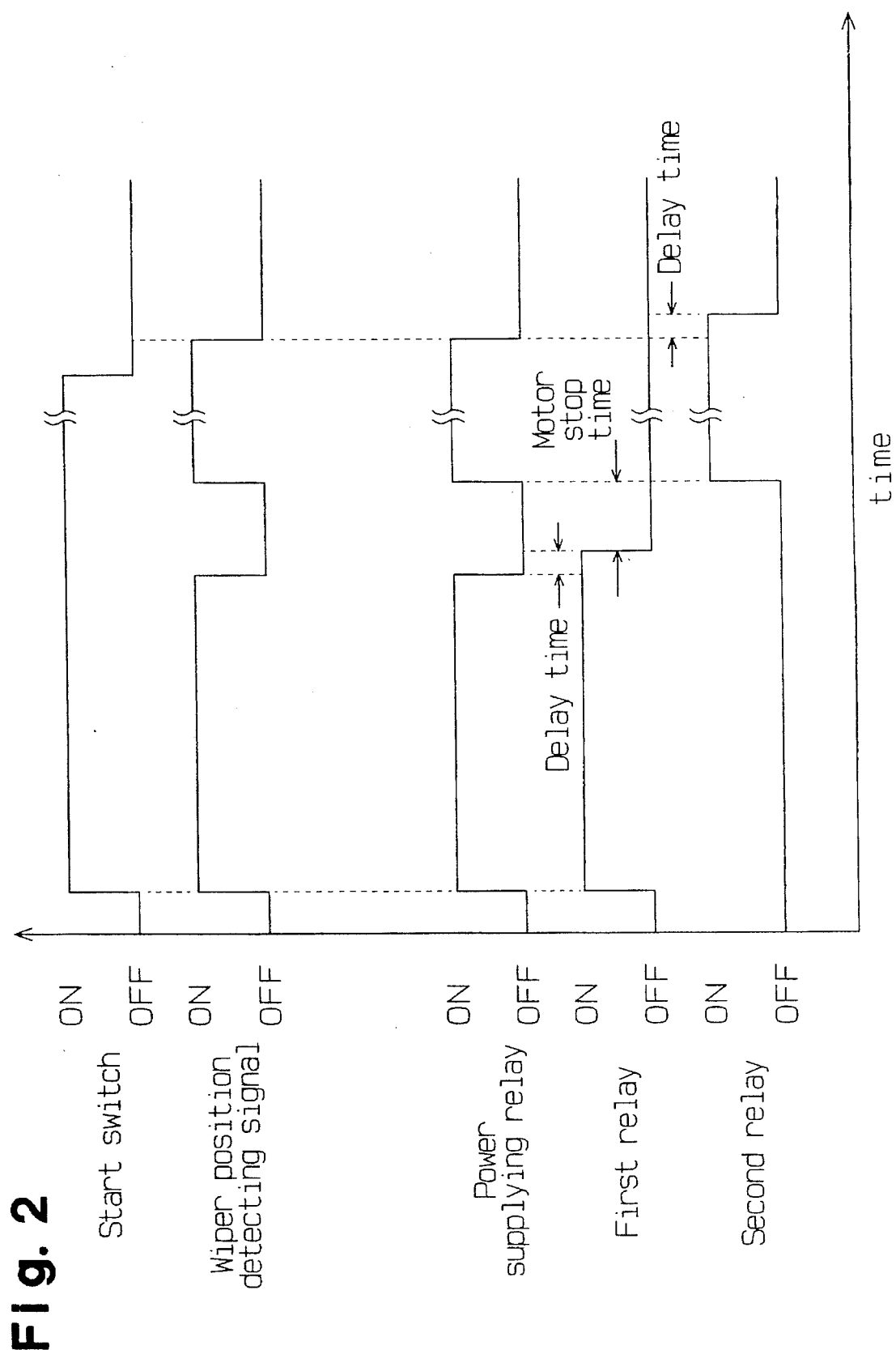
FIG. 2 is a timing chart illustrating the operational conditions of the drive control circuit of FIG. 1.

When the crank arm 15 reaches the second inversion position Y, and the wiper arms 16 reach the home position A, the controller 2 drives the motor 12 to reversely rotate, based on a wiper position detected signal (referred to FIG. 2). Hence, the crank arm 15 shifts from the second inversion position Y to the first inversion position X, in the counter-clockwise direction. Accordingly, the wiper arms 16 further forwardly move from the home position A to the inversion position B, and then move back to the home position A. When the crank arm 15 reaches the first inversion position X, the controller 2 again drives the motor 12 to rotate in the forward direction. Therefore, the wiper arms 16 repeatedly make a complete forward-backward movement. Continuously repeating the above-mentioned forward-backward movement, the wiper arms 16 wipe a wind shield of the vehicle.

Operations of the control circuit 1 according to this embodiment will now be described.

When the start switch 4 is activated or turned on while the wiper arms 16 are at home position A, the controller 2 transmits the signal having the H level potential to each base of the transistors Tr1 and Tr2, in order to activate the transistors Tr1 and Tr2. Hence, the coils 6 and 8 shown in FIG. 1 are energized, such that the power supplying relay Ry and the first relay Ry1 become operative (referred to FIG. 2).

Figure 3:
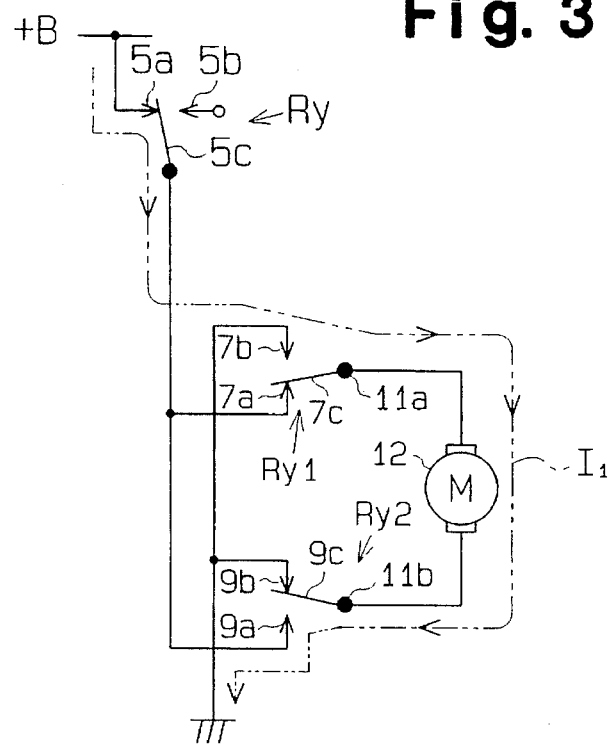
FIGS. 3 through 6 are circuit diagrams illustrating various actions of the drive control circuit of FIG. 1.

As shown in FIG. 3, the movable contact 5c of the power supplying relay Ry is connected with the contact 5a, and the movable contact 7c of the first relay Ry1 is connected with the contact 7a. Therefore, the terminal 11a of the motor 12 is connected with the positive electrode of the power supply 3, and the terminal 11b is connected with the negative electrode of the power supply 3.

Therefore, the current I1 flows from the power supply 3 to the motor 12, such that the motor 12 rotates in the forward direction. This rotation of the motor 12 causes the crank arms 15 to move from the first inversion position X to the second inversion position Y. The wiper arms 16 make a complete forward-backward movement between the home position A and the inversion position B.

Figure 4:
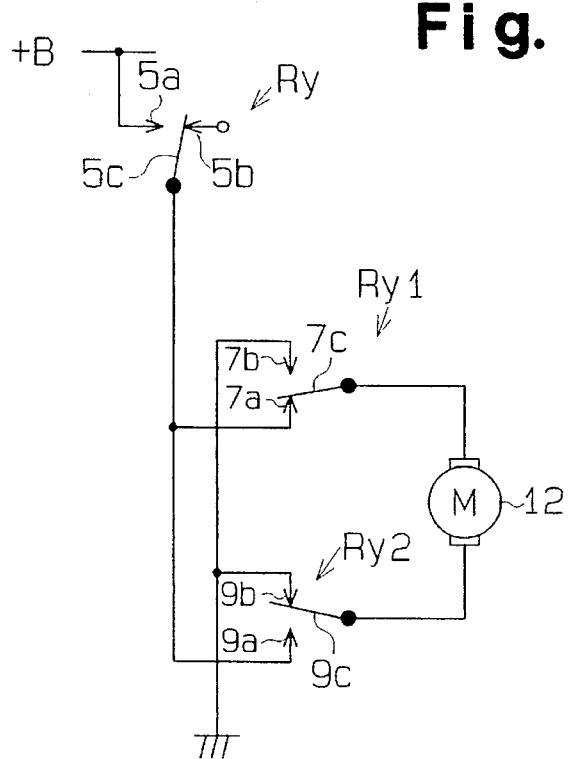

When the crank arm 15 reaches the second inversion position Y, a wiper position detected signal is outputted. In response to this signal, the controller 2 transmits the signal having the L level potential to the base of the transistor Tr1 to turn off the transistor Tr1, in order to reversely rotate the motor 12. Consequently, the coil 6 is de-energized, such that the power supplying relay Ry becomes non-operative, as shown in FIG. 2. The movable contact 5c of the power supplying contact Ry is disconnected from the contact 5a, as shown in FIG. 4, and is then connected with the contact 5b. Hence, the current I1 is no longer flowed from the power supply 3 to the motor 12.

Figure 5:
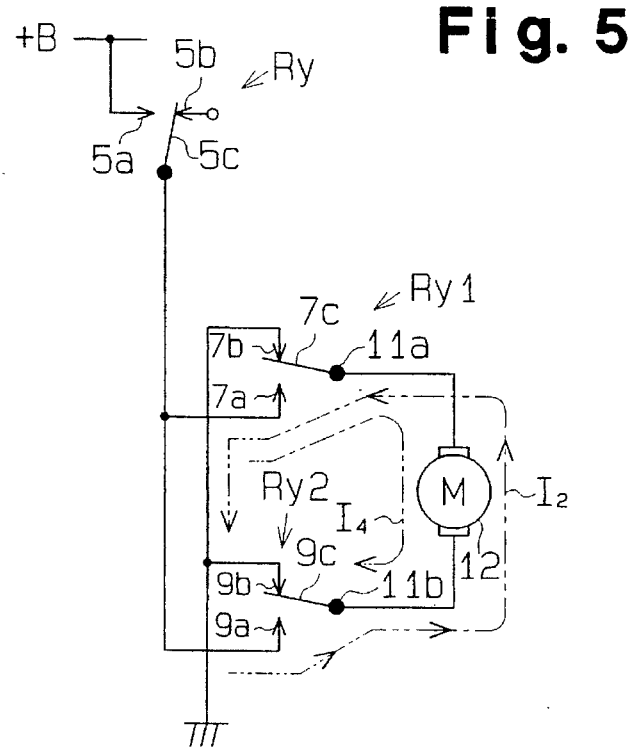

As shown in FIG. 2, after a predetermined delay time (in this embodiment, approximately 100 milliseconds) has elapsed, the controller 2 transmits the signal having the L level potential to the base of the transistor Tr2, in order to turned off the transistor Tr2. As shown in FIG. 2, the coil 8 of the first relay Ry1 is de-energized, and then the moving contact 7c is connected with the contact 7b (referred to FIG. 5). Then, a closed loop including the motor 12 is formed. At this time, the current I2 having a reverse flowing direction with respect to the current described above, flows to the motor 12 within the closed loop, which is based on the electromotive force generated by the inertia force of the motor. As a result, the motor 12 is immediately stopped.

Figure 6:
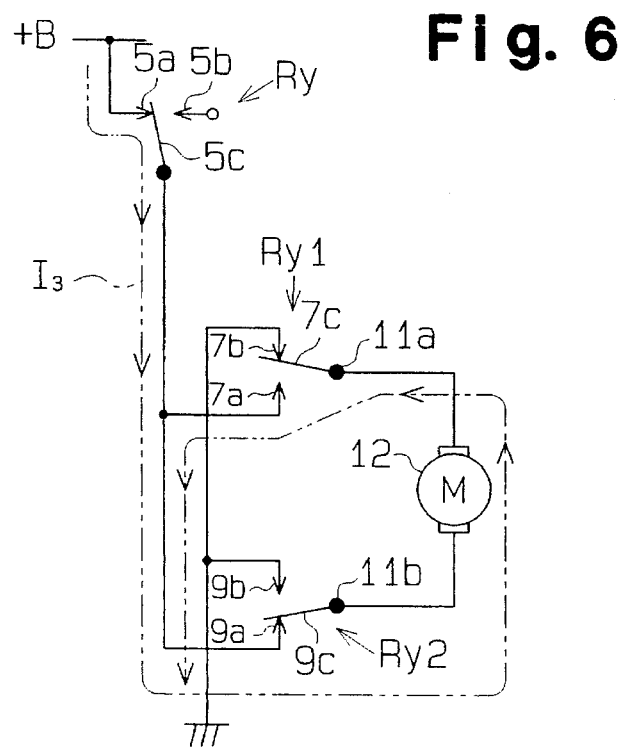

After that, the controller 2 transmits the signal having the H level potentials to the bases of the transistors Tr1 and Tr3, so as to turn on the transistors Tr1 and Tr3. Then, the coils 6 and 10 of the power supplying relay Ry and the second relay Ry2 are respectively energized, as shown in FIG. 2. Consequently, the movable contact 5c is disconnected from the contact 5b, and is then connected with the contact 5a. The movable contact 9c is also disconnected from the contact 9b, and then is connected with the contact 9a, as shown in FIG. 6.

Therefore, the terminal 11a of the motor 12 is connected with the negative electrode of the power supply 3, and the terminal 11b is connected with the positive electrode of the power supply 3. The current I3 flows from the power supply 3 to the motor 12, to cause the motor 12 to rotate in the backward direction. In response to this operation, the wiper arms 16 repeatedly make another complete forward-backward movement.

On the other hand, in order to stop the wiping operation by the wiper arms 16, the switch 4 is turned off. The controller 2 waits for being inputting a position detection signal having an L level potential to be inputted therein, as shown in FIG. 2. When this signal is inputted to the controller 2, the controller 2 transmits the signal having the L level potential to the base of the transistor Tr1, so as to turn off the transistor Tr1. Consequently, the coil 6 is de-energized, such that the power supplying relay Ry becomes non-operative, as shown in FIG. 2. As a result, the movable contact 5c of the power supplying relay Ry is disconnected from the contact 5a, and is then connected with the contact 5b. Hence, the contact 7a of the first relay Ry1 is disconnected from the positive electrode of the power supply 3. Therefore, the current I3 is no longer flowed from the power supply 3 to the motor 12.

After a predetermined delay time (in this embodiment, approximately 100 milliseconds) has elapsed, the controller 2 transmits the signal having the L level potential to the base of the transistor Tr3, such that the transistor Tr3 is turned off. Consequently, the coil 10 is de-energized, such that the second relay Ry2 becomes non-operative, as shown in FIG. 2. Then, the moving contact 9c of the second relay Ry2 is disconnected from the contact 9a, and is the connected with contact 9b, as shown in FIG. 1. As a result, each one of the terminals 11a and 11b of the motor 12 is connected with the negative electrode of the power supply 3, via the moving contacts 7c and 9c, and the contacts 7a and 9a, respectively. Therefore, a closed loop including the motor 12 is formed again, such that the motor 12 is immediately stopped.

As described above, according to this embodiment, when the motor 12 is to be stopped or its rotational directions are altered, at first, the power supplying relay Ry is activated, so as to stop the power to be supplied to the motor. After that, one contact arrangement of the first and second relays Ry1 and Ry2 is switched to another contact arrangement, in order to alter the rotational directions of the motor. Therefore, the short-circuit current flow based on the discharge between the contacts 7a, 7b and 9a, 9b of the first and second relays Ry1, Ry2, and the moving contacts 7c, 9c, is inhibited. As a result, the melt-down damages of the contacts 7a, 7b, 9a, and 9b are prevented.

When the moving contact 5c of the power supplying relay Ry is disconnected from the contact 5a and is connected to the contact 5b, the first and second relays connected to the associated terminals of the motor 12, are still connected with the positive and negative electrodes of the power supply 3, respectively. Therefore, the discharge occurs between the moving contact 5c and the contact 5a. However, the short-circuit current generated by the discharge can be prevented by internal resistance of the motor 12.

Further, the controller 2 controls the first and second relays Ry1, Ry2, and the power supplying relay Ry to become operative or non-operative, by controlling the transistors Tr1 through Tr3. These transistors prevent the noise caused by the first and second relays Ry1, Ry2, and the power supplying relay Ry from introducing into the controller 2. As a result, the malfunction of the controller 2 is prevented.

Figure 7:
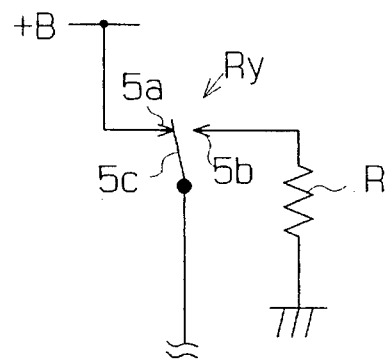
FIG. 7 is a circuit diagram illustrating modified example of a power supply circuit portion of the drive circuit of FIG. 1.

According to this embodiment, after the approximately 100 milliseconds of delay time has elapsed since the power supplying relay Ry became non-operative, the first and second relays Ry1 and Ry2 are switched to become non-operative. This delay time can be alternated upon requests. Further, a resistor R shown in FIG. 7 can be connected with the contact 5b of the power supplying relay Ry, such that the resistor R can absorb the switching surge generated by the relay Ry.

A transistor can be employed, in place of the power supplying relay Ry, for controlling the power to be either supplied or cut off to the first and second relays Ry1 and Ry2, based on the ON or OFF condition of this transistor.

Although this embodiment relates to the motor for driving wipers, the present invention can be embodied in many other devices.

Therefore, the present examples and embodiments are to be considered as illustrative and not restrictive, and the invention is not to be limited to the details giving herein, but may be modified within the scope of the appended claims.

What is claimed is:

1. A control circuit for driving a motor, said motor having a pair of terminals, said control circuit comprising:

a power supply having a positive electrode and a negative electrode;

first and second relays each having a positive contact, a negative contact and a movable contact, said negative contact being connected to the negative electrode, said movable contact being connected to one of said terminals, wherein said first and second relays perform at least one of switching of the rotational direction of said motor and making the rotation of said motor stop according to switching the connecting arrangement of the movable contact to the positive contact and the negative contact;

power connecting means having a first contact, a second contact, and a movable contact, said first contact being connected to the positive electrode of the power supply, said second contact being located apart from the first contact and said movable contact being connected to the positive contacts of the relays and being selectively connected to the first contact and the second contact; and control means for controlling the first relay, the second relay and the power connecting means to drive the motor, wherein said control means:

a) connects the movable contact of the power connecting means with the positive contact, connects the movable contact of the first relay with the positive contact, and connects the movable contact of the second relay with the negative contact in order to rotate the motor normally;

b) switches the movable contact of the power connecting means to connect with the second contact thereof;

c) then switches the movable contact of the first relay to connect the negative contact thereof in order to generate electromotive force by means of inertia of the motor to make the motor stop;

d) switches the movable contact of the second relay to connect with the positive contact thereof in order to change the rotational direction of the motor from the normal direction to the reverse direction; and e) switches the movable contact of the power connecting means to connect with the first contact to supply the power to the motor to rotate the motor reversely.

2. The control circuit according to claim 1, wherein said power connecting means includes a third relay.

3. The control circuit according to claim 2, wherein said control means includes switching circuits each of which corresponds to each of said relays, in order to control said first, second and third relays, and a controller which controls each of said switching circuits.

4. The control circuit according to claim 3, wherein said motor drives wipers for use in a vehicle.

5. The control circuit according to claim 4, wherein said controller controls each of said switching circuits, based on inputted signals which reflect the operational conditions of said wipers.

* * * * *